(12) United States Patent
Murakami (10) Patent No.: US 10,640,132 B2
(45) Date of Patent: May 5, 2020

(54) ARTICLE TRANSPORT FACILITY

(71) Applicant: Daifuku Co., Ltd., Osaka-shi (JP)

(72) Inventor: Ryuya Murakami, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 353 days.

(21) Appl. No.: 15/730,140

(22) Filed: Oct. 11, 2017

(65) Prior Publication Data

US 2018/0099680 A1 Apr. 12, 2018

(30) Foreign Application Priority Data

Oct. 12, 2016 (JP) .................................. 2016-201210

(51) Int. Cl.
*B61B 3/02* (2006.01)
*B60L 5/00* (2006.01)
*B61B 13/04* (2006.01)
*B61B 13/12* (2006.01)
*B61D 27/00* (2006.01)
*B60M 7/00* (2006.01)

(52) U.S. Cl.
CPC .................. *B61B 3/02* (2013.01); *B60L 5/00* (2013.01); *B60L 5/005* (2013.01); *B61B 13/04* (2013.01); *B61B 13/127* (2013.01); *B61D 27/009* (2013.01); *B60L 2200/26* (2013.01); *B60M 7/00* (2013.01); *Y02T 90/16* (2013.01)

(58) Field of Classification Search
CPC .............. B61B 3/02; B08B 5/04; B65G 45/10
See application file for complete search history.

(56) References Cited

U.S. PATENT DOCUMENTS 6,324,989 B1 * 12/2001 Taylor ....................... B61B 3/02
104/106
8,844,092 B2 * 9/2014 Morimoto .............. B65G 45/00
15/339

FOREIGN PATENT DOCUMENTS

| JP | 6373936 U | 5/1988 |
| JP | 63304640 A | 12/1988 |
| JP | 2001128303 A | 5/2001 |
| JP | 2008308267 A | 12/2008 |

* cited by examiner

*Primary Examiner* — Zachary L Kuhfuss
(74) *Attorney, Agent, or Firm* — The Webb Law Firm (57) ABSTRACT

The article transport vehicle travels with its wheel rolling on the travel surface provided on the upper surface of the travel rail. The travel rail has a peripheral wall that includes a surface on which the travel surface is formed, and an internal space that is enclosed by the peripheral wall, and extends along the travel path. The travel surface has a through hole that passes through the peripheral wall, and brings the internal space into communication with an external space. The travel rail is provided with a suction device that is in communication with the internal space, and is configured to suck air in the internal space. The internal space is closed except for the through hole, and a connection portion for the suction device.

18 Claims, 4 Drawing Sheets

ARTICLE TRANSPORT FACILITY

CROSS-REFERENCE TO RELATED APPLICATION

This application claims priority to Japanese Patent Application No. 2016-201210 filed Oct. 12, 2016, the disclosure of which is hereby incorporated in its entirety by reference.

TECHNICAL FIELD

The present invention relates to an article transport facility in which an article transport vehicle travels with its wheel rolling on a travel surface provided on a travel rail.

BACKGROUND ART

Various article transport facilities that use rail-guided article transport vehicles are in practical use. In article transport facilities with a rail, dust is generated as a result of the rail and wheels of article transport vehicles coming into contact with each other, and may make the article transport facilities dusty. Regular manual cleaning of dusty article transport facilities takes time and effort. JP 2001-128303A discloses an article transport facility that has a function of removing such dust (hereinafter, reference numerals in parentheses in BACKGROUND ART denote corresponding components in the referenced document). In this article transport facility, a truck (12) travels along a rail (2) having a U-shaped cross section in a state in which a travel wheel (25) of the truck (12) is in contact with the bottom of the rail (2), and guide rollers (26) are in contact with the inner surface of the U-shaped rail (2). Holes are formed in the bottom of the rail (2), and a filter fan unit (10) is provided on the outer side of the bottom of the rail (2). The filter fan unit (10) sucks air from the holes formed in the bottom to remove dust generated as a result of the truck (12) traveling (see, for example, FIG. 1 and paragraph [0011] of JP 2001-128303A)

In such a case where an article transport vehicle travels on the bottom of a U-shaped rail that serves as a travel surface, dust generated due to travel accumulates inside the rail, and thus it is possible to suck out the dust via the holes provided in the bottom. However, there is also a type of article transport facility in which an article transport vehicle travels on the upper surface of a rail that serves as a travel surface. In this case, dust generated due to travel does not accumulate in a relatively closed space (space that is enclosed in its periphery while being partially open, such as the inside of a U-shaped rail), and thus it is more difficult to automatically collect the dust. Accordingly, it is desirable to appropriately remove dust that is generated as a result of an article transport vehicle traveling, even if a travel surface is provided in an open space.

SUMMARY OF THE INVENTION

In view of the foregoing circumstances, it is desirable to provide a technique to, if an article transport vehicle travels with its wheel rolling on a travel surface that is provided on the upper surface of a travel rail, appropriately remove dust that is generated due to travel.

Accordingly, as an aspect, an article transport facility in which a travel rail is laid along a travel path of an article transport vehicle, and the article transport vehicle travels with a wheel of the article transport vehicle rolling on a travel surface provided on an upper surface of the travel rail, wherein the travel rail has a peripheral wall that includes a surface on which the travel surface is formed, and an internal space that is enclosed by the peripheral wall and extends along the travel path, the travel surface has a through hole that passes through the peripheral wall, and brings the internal space into communication with an external space, a suction device that is in communication with the internal space, and is configured to suck air in the internal space is further provided, and the internal space is closed except for the through hole, and a connection portion for the suction device.

According to this configuration, dust that is generated as a result of the wheel coming into contact with the upper surface (travel surface) of the travel rail that is located in an open space is unlikely to diffuse into the open space. In other words, the travel surface has the through hole that is in communication with the internal space of the travel rail that has a hollow structure, and negative pressure is exerted in the through hole as a result of the air in the internal space being sucked by the suction device. Accordingly, the dust generated on the travel surface is sucked into the internal space via the through hole, and is unlikely to diffuse into the external space. Furthermore, since the internal space is closed except for the through hole, and the connection portion for the suction device, it is possible to exert sufficient negative pressure in the through hole. Accordingly, with this configuration, if the article transport vehicle travels with its wheel rolling on the travel surface provided on the upper surface of the travel rail, it is possible to appropriately remove dust that is generated due to travel.

Further characteristics and advantages of the article transport facility will become apparent from the following description of embodiments that will be given with reference to the drawings.

DETAILED DESCRIPTION OF PREFERRED EMBODIMENTS

Figure 1:
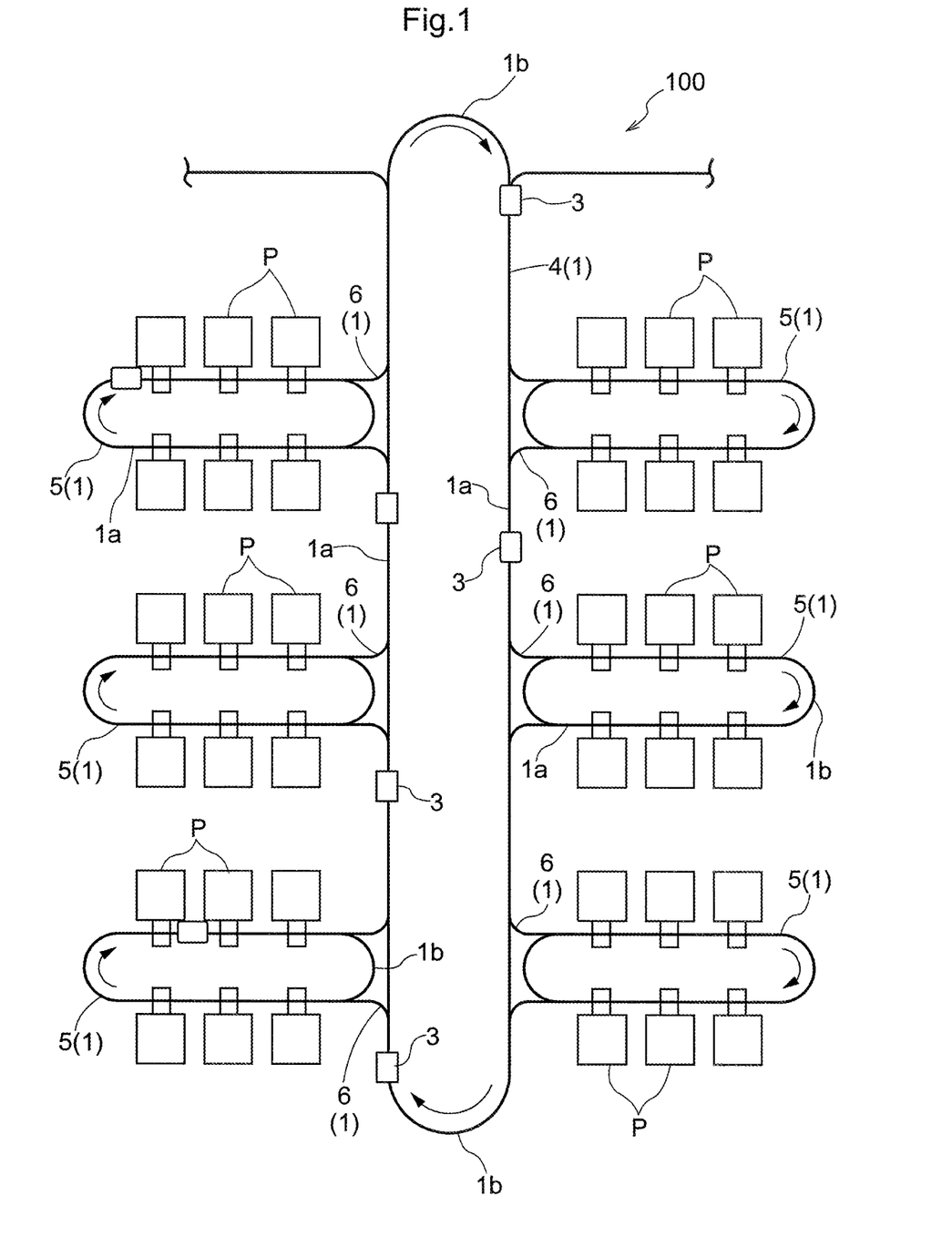
FIG. 1 is a plan view illustrating an article transport facility.
Figure 2:
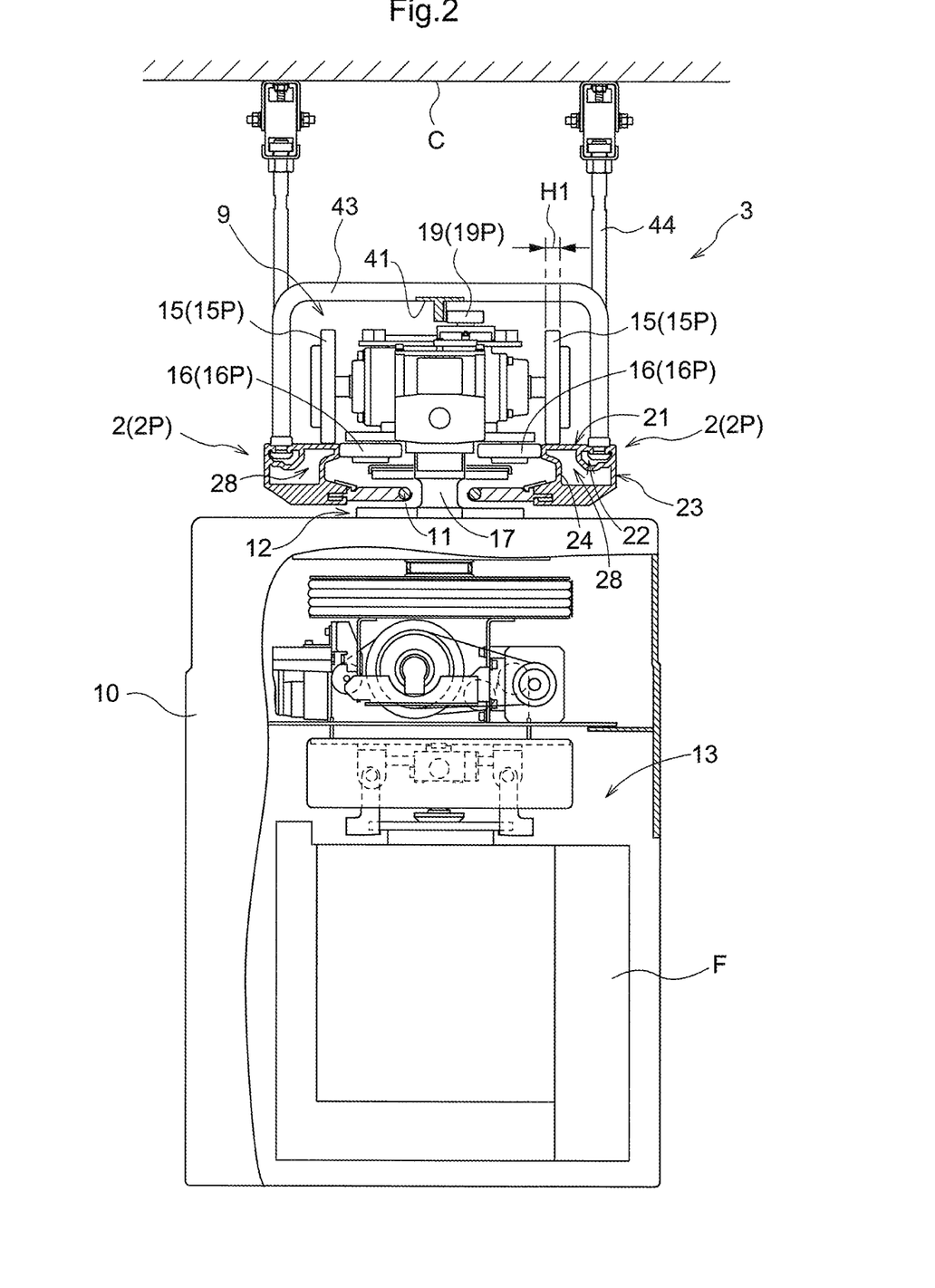
FIG. 2 is a rear view illustrating an article transport vehicle.

Hereinafter, embodiments of an article transport facility will be described with reference to the drawings. As shown in FIGS. 1 and 2, an article transport facility 100 includes a travel rail 2 that is laid along a travel path 1, and article transport vehicles 3 that travel on the travel rail 2 along the travel path 1. Note that in the present embodiment, the article transport vehicles 3 each transport a front opening unified pod (FOUP) that accommodates semiconductor substrates, which serve as articles F.

The travel path 1 is provided with one annular main path 4, a plurality of annular sub paths 5, and a plurality of connection paths 6 that connect the main path 4 and the sub paths 5. The sub paths 5 each have the shape of an annular loop that is smaller than the main path 4, and pass by a plurality of article treating portions P. The article transport vehicles 3 travel in the same circulating direction (clockwise direction as indicated by arrows in FIG. 1) in between the main path 4 and the plurality of sub paths 5. The travel path 1 includes straight portions 1a that extend straight, and curved portions 1b that extend in a curve. The connection paths 6 include branched connection paths 6 that branch from the main path 4 to the sub paths 5, and merging connection paths 6 that merge from the sub paths 5 with the main path 4.

In the following description, it is assumed that "vehicle body width direction" refers to a direction that is orthogonal to the front-rear direction (travel direction) of an article transport vehicle 3 when seen in the up-down direction. FIG. 2 shows an article transport vehicle 3 when seen from the rear (in a rear view). In the description, when "left" and "right" are mentioned with respect to the vehicle body width direction, "left" and "right" in the rear view are specified. With respect to the travel path 1 (travel rail 2), it is assumed that "path longitudinal direction" (or a direction in which the travel rail 2 extends) refers to a direction along the travel path 1, and "width direction W" refers to a direction that is orthogonal to the path longitudinal direction when seen in the up-down direction (direction on a horizontal plane that is orthogonal to the travel path 1). For example, when the article transport vehicle 3 travels on the straight portions 1a of the travel path 1, the travel direction and the path longitudinal direction are identical, and the vehicle body width direction and the width direction W are identical. Note that, as will be described later, two travel rails 2 are arranged in parallel to each other on a horizontal plane to constitute a travel rail pair 2P. In other words, the travel rails of the travel rail pair 2P are arranged in parallel to each other with a constant distance in the width direction W therebetween (see FIG. 3 and the like). "Width directional inner side W1" refers to a side in the width direction W on which a travel rail 2 faces the other travel rail 2, and "width directional outer side W2" refers to a side in the width direction W that is opposite to the width directional inner side W1.

As shown in FIG. 2, the article transport vehicle 3 is provided with: a travel portion 9 that travels as a result of wheels 15 rolling on travel surfaces 21 that are provided on the upper surfaces of the travel rails 2 suspended from and supported by a ceiling C; a transport vehicle main body 10 that is located below the travel rails 2, and is suspended from and supported by the travel portion 9; and an electric power receiving portion 12 that receives, in a noncontact manner, driving electric power from a supply line 11 that is laid along the travel path 1.

The transport vehicle main body 10 is provided with a supporting portion 13 that is raised and lowered with respect to the transport vehicle main body 10 while supporting the articles F in a suspended state. Note that a plurality of travel portions 9 (for example, two travel portions of a first travel portion on the front side and a second travel portion on the rear side) that are lined up in the front-rear direction may also be provided, but in the present embodiment, they are referred to simply as the "travel portion 9" without being distinguished from each other.

The travel portion 9 (or each travel portion 9) is provided with a pair of left and right wheels 15 (wheel pair 15P) that are driven by a not-shown motor. The wheel pair 15P is provided on the travel portion 9 so as to travel on the upper surfaces (travel surfaces 21) of the pair of left and right travel rails 2 (travel rail pair 2P) that serve as the travel rails 2. Furthermore, the travel portion 9 is provided with a pair of left and right guide wheels 16 (guide wheel pair 16P) that are each subjected to free rotation about a shaft extending in the up-down direction of the vehicle body (vertical shaft rotation). The pair of left and right guide wheels 16 are provided on the travel portion 9 so as to abut against inner surfaces 27 (see FIG. 4 and the like) of the respective travel rails 2.

The travel portion 9 (or each travel portion 9) is provided with a coupling shaft 17 that protrudes downward from the lower end of the wheel pair 15P. As shown in FIG. 2, the coupling shaft 17 of the travel portion 9 and the transport vehicle main body 10 are coupled to each other so as to be rotatable relative to each other about a vertical axis in the up-down direction. If, for example, the travel portion 9 includes two travel portions of the first travel portion on the front side and the second travel portion on the rear side, the first travel portion and the second travel portion are each provided with a coupling shaft 17. The first travel portion and the second travel portion are coupled to the transport vehicle main body 10 so as to be rotatable relative thereto. In other words, the first travel portion and the second travel portion can swing about vertical axes with respect to the transport vehicle main body 10. Accordingly, even if the article transport vehicle 3 is configured with a plurality of travel portions 9, the article transport vehicle 3 can travel along the curved portions 1b of the travel path 1. As a result of the guide wheels 16 being guided while being in contact with the travel rail pair 2P, the article transport vehicle 3 travels along the travel path 1 while maintaining the orientation of the travel portion 9 along the travel path 1.

As shown in FIG. 2, the travel portion 9 is provided with an auxiliary guide wheel 19 that is located above the wheels 15, and rotates about a vertical shaft (shaft extending in the up-down direction of the vehicle body). Preferably, a pair of front and rear auxiliary guide wheels 19 are provided with a rotation shaft of the wheels 15 of one travel portion 9 interposed therebetween. The pair of front and rear auxiliary guide wheels 19 are collectively referred to as an "auxiliary guide wheel pair 19P". The auxiliary guide wheel pair 19P is moved together in the vehicle body width direction by the motor.

The travel portion 9 is configured such that the positions of the auxiliary guide wheels 19 are moved between a right guide position and a left guide position as a result of the auxiliary guide wheel pair 19P being moved in the vehicle body width direction. As shown in FIG. 2, the right guide position is a position at which the auxiliary guide wheel pair 19P is located on the right side of the center, in the vehicle body width direction, of the travel portion 9, and abuts against a guide rail 41 from the right side. The left guide position is a position at which the auxiliary guide wheel pair 19P is located on the left side of the center, in the vehicle body width direction, of the travel portion 9, and abuts against the guide rail 41 from the left side.

Figure 3:
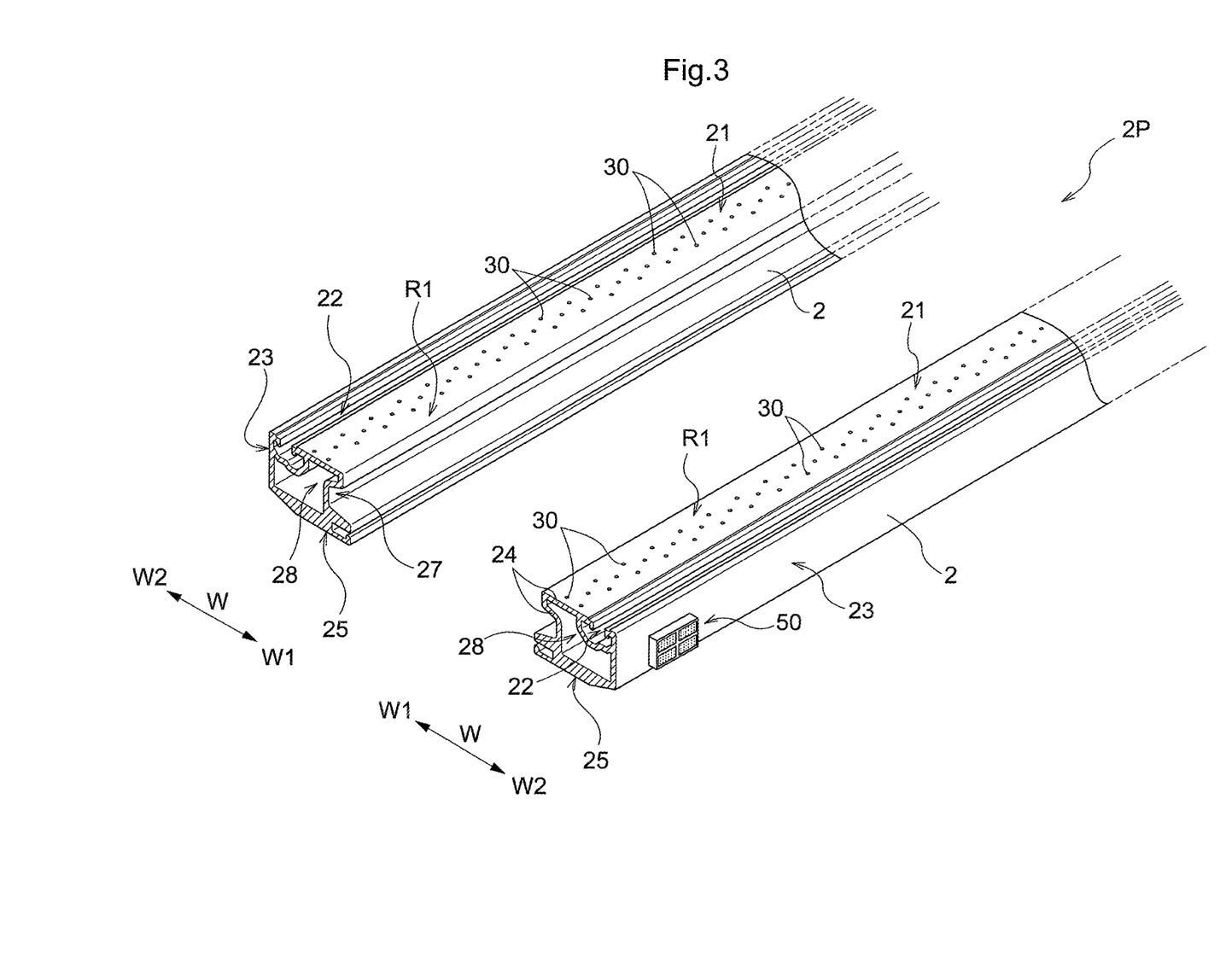
FIG. 3 is a perspective view illustrating a travel rail pair.

As shown in FIGS. 2 and 3, in the present embodiment, two travel rails 2 are arranged in parallel to each other on a horizontal plane to constitute the travel rail pair 2P. In other words, the travel rails of the travel rail pair 2P are arranged in parallel to each other with a constant distance in the width direction W therebetween. Each travel rail 2 is provided with a mounting groove 22 into which a supporting member 43 and a suspended member 44 are mounted, and extends along the travel path 1 (in the direction in which the travel rail 2 extends). As shown in FIG. 2, one end of the suspended member 44 is mounted in the mounting groove 22. The other end of the suspended member 44 is fixed to the ceiling C. The two travel rails 2 that constitute the travel rail pair 2P are suspended from and supported by the ceiling using the suspended members 44.

Furthermore, as shown in FIG. 2, the two travel rails 2 that constitute the travel rail pair 2P are coupled to each other by the supporting member 43, which is formed in an inverted U shape (in a cross section taken in the width direction) when seen in the direction along the path longitudinal direction, between the suspended members 44 provided along the travel path 1 (in the direction in which the travel rails 2 extend). Note that the above-described guide rail 41 is coupled to the supporting member 43 and is supported by the supporting member 43. Furthermore, each travel rail 2 has a peripheral wall 24 that includes a surface on which a travel surface 21 is formed, and an internal space 28 that is enclosed by the peripheral wall 24, and extends along the travel path 1.

Figure 4:
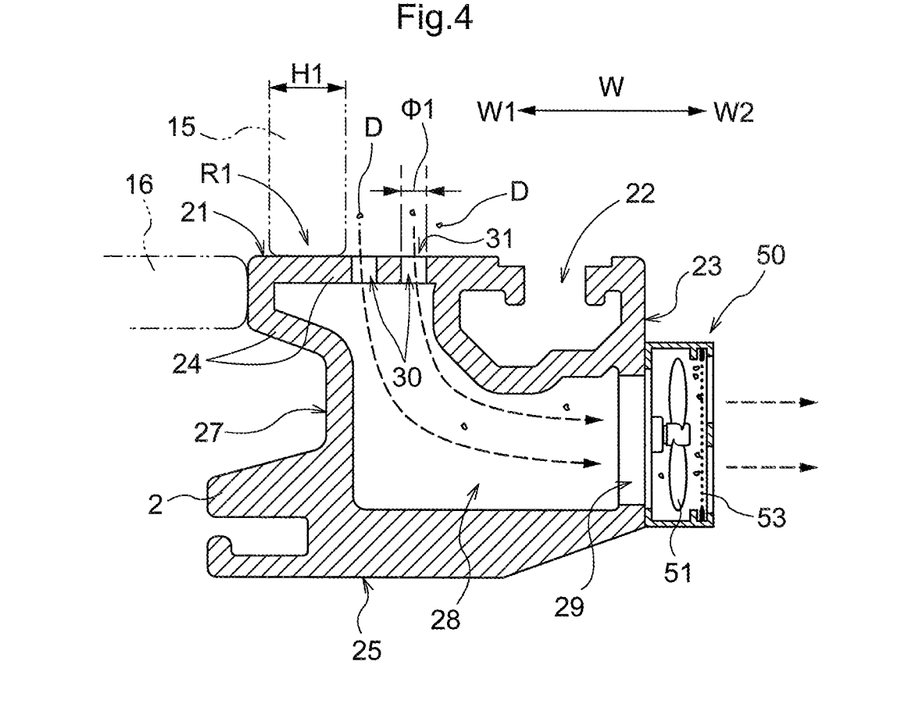
FIG. 4 is a cross-sectional view of a travel rail taken at a position at which a fan filter unit is installed.

As shown in FIGS. 3 and 4, the travel surface 21 has through holes 30 that pass through the peripheral wall 24, and bring the internal space 28 into communication with an external space. In other words, the travel surface 21 has openings 31 of the through holes 30 (see FIG. 4). Furthermore, a suction device 50 that is in communication with the internal space 28, and is configured to suck air in the internal space 28 is provided on the travel rail 2. As shown in FIG. 1, in the present embodiment, the travel path 1 has an annular shape, and thus the internal space 28 is closed except for the through holes 30, and a connection portion for the suction device 50 (see a suction hole 29 of FIG. 4). If a travel path 1 has a non-annular shape and has end portions, then the end portions are closed to make a closed internal space 28.

As described above, the travel surface 21 has the through holes 30 that are in communication with the internal space 28 of the travel rail 2 having a hollow structure. Negative pressure is exerted in the through holes 30 as a result of air in the internal space 28 being sucked by the suction device 50. Since, as described above, the internal space 28 is closed except for the through holes 30 and the connection portion (suction hole 29) for the suction device 50, it is possible to exert sufficient negative pressure in the through holes 30. Accordingly, as shown in FIG. 4, dust D generated on the travel surface 21 is sucked into the internal space 28 via the through holes 30, and is unlikely to diffuse into the external space.

In the present embodiment, the suction device 50 is a fan filter unit in which a suction fan 51 and a filter 53 that captures the dust D are formed as an integral unit. The suction device 50 serving as a fan filter unit makes it possible to exert negative pressure in the through holes 30, to capture the sucked dust D using the filter 53, and to appropriately remove the dust D. Furthermore, since the fan 51 and the filter 53 are formed as an integral unit, it is easy to, for example, install the suction device 50 in the article transport facility 100, and replace the suction device 50 for maintenance.

As shown in FIG. 4, the suction device 50 is installed on a wall surface (outer surface 23 in the present embodiment) of the peripheral wall 24 on which no travel surface 21 is formed. This wall surface (outer surface 23) is provided with the suction hole 29 for bringing the suction device 50 and the internal space 28 into communication with each other. Since the through holes 30 are open in the travel surface 21, and the suction hole 29 is formed in a surface other than the travel surface 21, it is possible to make air flow smoothly when negative pressure is exerted in the through holes 30 via the internal space 28, as shown in dotted lines in FIG. 4. Furthermore, a wheel 15 rolls on the travel surface 21, and thus, if a suction hole 29 is to be formed in the travel surface 21, then it may be necessary to increase the width of the travel rail 2 or form the suction hole 29 outside the range of travel (for example, outside a travel region R1 which will be described later). However, such a restriction is eliminated by forming the suction hole 29 in a wall surface (outer surface 23, a lower surface 25, the inner surface 27, or the like) on which no travel surface 21 is formed.

In the present embodiment, the fan filter unit serving as the suction device 50 is installed on the outer surface 23 (side wall surface), on the width directional outer side W2, of the peripheral wall 24. Accordingly, even if the article transport vehicle 3 is located at the position on the travel path 1 at which the suction device 50 is installed, it is easy for an operator to perform maintenance such as inspection of the suction device 50 or replacement of the filter 53.

Figure 5:
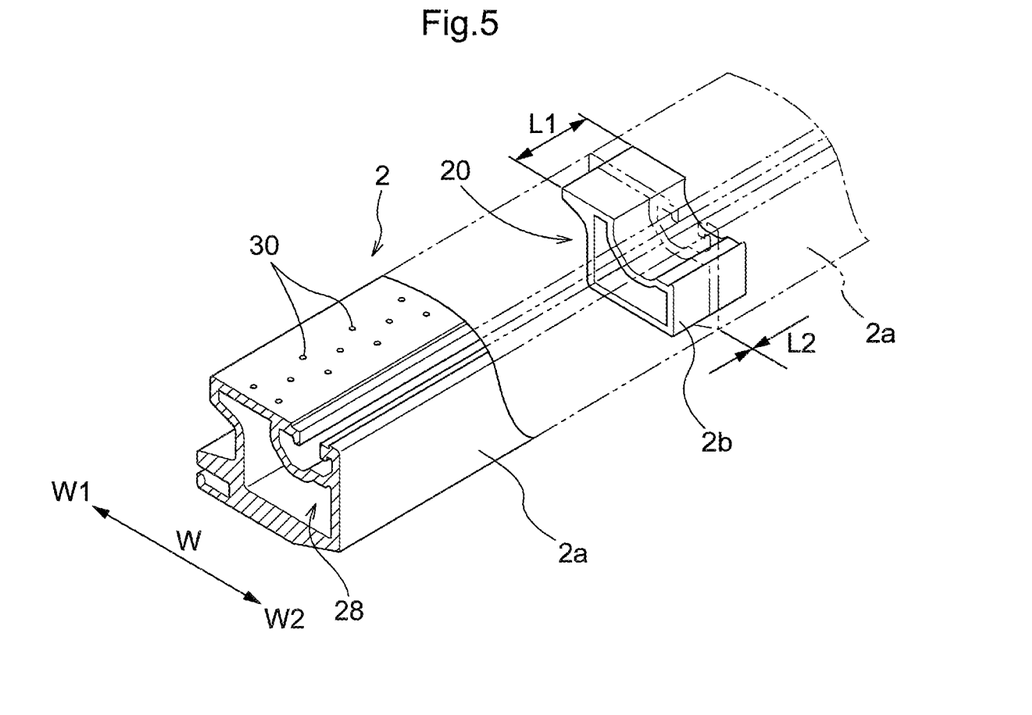
FIG. 5 is a perspective view illustrating a joint portion of rail members.

Meanwhile, the travel path 1 is long, and often the travel rail 2 is formed by joining a plurality of rail members 2a to each other in the direction along the travel path 1 (see FIG. 5). As a result of the plurality of rail members 2a being joined to each other, the internal spaces 28 as well are connected to each other to form one contiguous internal space 28. However, in a joint portion 20 (see FIG. 5) in which two rail members 2a adjacent along the travel path 1 are joined to each other, there is the risk that airtightness of the internal space 28 may be impaired. Accordingly, in the present embodiment, as shown in FIG. 5, the joint portion 20 is provided with a sealing member 2b that blocks communication between the internal space 28 and the external space. Note that, if the rail members 2a are made of metal, there is the possibility that the rail members 2a will expand and contract in the direction along the travel path 1 depending on the temperature. If the rail members 2a contract, then a gap will be created between the two rail members 2a that are adjacent in the direction along the travel path 1, and thus the sealing member 2b has a length L1 in the direction along the travel path 1 that is larger than a gap L2 that may be created if the rail members 2a contract.

Furthermore, in the present embodiment, the opening 31 of each through hole 30 on the travel surface 21 has a diameter φ1 that is smaller than a wheel width H1, which is a width in the rotation shaft direction of the contact surface of the wheel 15 that comes into contact with the travel surface 21 (see FIG. 4). The larger the diameter φ1 of the through holes 30, the more likely the dust D enters the internal space 28 and is removed. However, the through holes 30 have their openings 31 in the travel surface 21, and thus if the openings 31 have a large diameter φ1, then there is the risk that the wheel 15 may fall into a through hole, and noise or vibration of the article transport vehicle 3 may increase. Furthermore, there is also the risk that the rims of the openings 31 are likely to crack or wear due to coming into contact with the wheel 15, and dust D is likely to be generated. Accordingly, it is preferable that the diameter φ1 of the openings 31 of the through holes 30 be smaller than the wheel width H1.

Furthermore, in the present embodiment, as shown in FIGS. 3 and 4, the travel region R1 in which the wheel 15 travels is provided on the travel surface 21 on the width directional inner side W1, and the openings 31 of the through holes 30 are provided on the travel surface 21 on the width directional outer side W2 of the travel region R1. There is the risk that, even if the diameter φ1 of the openings 31 is smaller than the wheel width H1, the wheel 15 rolling on the openings 31 of the through holes 30 may increase noise or vibration of the article transport vehicle 3. Furthermore, there is also the risk that the rims of the openings 31 may crack or wear due to coming into contact with the wheel 15, and dust D may be generated. Accordingly, it is preferable that the travel surface 21 be divided into a region (travel region R1) in which the wheel 15 travels and a region in which the through holes 30 are open. These regions do not need to be completely separated from each other, but are preferably provided on one side in a direction so that there is less overlap therebetween. For example, if, as in the present embodiment, the travel region R1 is provided on the width directional inner side W1, and the openings 31 of the through holes 30 are provided on the width directional outer side W2 of the travel region R1, then both regions are unlikely to overlap.

Other Embodiments

Hereinafter, other embodiments will be described. Note that the configurations of the embodiments that will be described below are not limited to being applied alone, and each may be applied in combination with another one as long as they are consistent.

(1): The foregoing embodiment has shown an example in which the article transport vehicles 3 travel on the travel path 1 that is formed with the travel rail pair 2P, which is a pair of travel rails 2. However, an article transport facility 100 of a so-called monorail type is also conceivable in which the article transport vehicles 3 travel on a travel path 1 that is formed with a single travel rail 2.

(2): The foregoing embodiment has shown an example in which the joint portion 20 of the rail members 2a is provided with the sealing member 2b to improve the airtightness of the internal space 28. However, the rail members 2a may also be joined to each other by a connection portion that has lower airtightness than that of the sealing member 2b. The rail members 2a are typically elongated, and can obtain a certain degree of closure due to fluid resistance in the inner wall of the internal space 28. By exercising operator's ingenuity in setting the suction force, the installation place of the suction device 50, or the number of suction devices 50, for example, it is also possible to generate appropriate negative pressure in the through holes 30 without using a sealing member 2b that has high airtightness.

(3): The foregoing embodiment has shown an example in which the travel region R1 in which a wheel 15 travels is provided on the travel surface 21 on the width directional inner side W1, and the openings 31 of the through holes 30 are provided on the width directional outer side W2 of the travel region R1. However, depending on the structure of the article transport vehicles 3 or the like, a configuration in which the travel region R1 is provided on the width directional outer side W2, and the openings 31 of the through holes 30 are provided on the width directional inner side W1 of the travel region R1 is not necessarily excluded.

(4): The foregoing embodiment has shown an example in which the suction device 50 is provided on the side wall surface (outer surface 23), on the width directional outer side W2, of the peripheral wall 24. However, depending on the structure of the article transport vehicles 3, the suction device 50 may also be installed on the width directional inner side W1 (for example, to the inner surface 27) if there is an installation space for the suction device 50 on the width directional inner side W1 of the travel rail 2. Alternatively, if there is an installation space below the travel rail 2, the suction device 50 may also be installed downward thereof (for example, on the lower surface 25).

(5): The foregoing embodiment has shown an example in which the openings 31 of the through holes 30 formed in the travel surface 21 have a diameter $\varphi 1$ that is smaller than the wheel width H1, which is a width in the rotation shaft direction of the contact surface of a wheel 15 that comes into contact with the travel surface. However, the diameter $\varphi 1$ may also be equal to or larger than the wheel width H1 as long as the openings 31 can be provided so as not to overlap the travel region R1 in which the wheel 15 travels.

Overview of Embodiments

The following will briefly describe the overview of the article transport facility that has been explained above.

As an aspect, an article transport facility in which a travel rail is laid along a travel path of an article transport vehicle, and the article transport vehicle travels with a wheel of the article transport vehicle rolling on a travel surface provided on an upper surface of the travel rail, wherein the travel rail has a peripheral wall that includes a surface on which the travel surface is formed, and an internal space that is enclosed by the peripheral wall, and extends along the travel path, the travel surface has a through hole that passes through the peripheral wall, and brings the internal space into communication with an external space, a suction device that is in communication with the internal space, and is configured to suck air in the internal space is further provided, and the internal space is closed except for the through hole, and a connection portion for the suction device.

According to this configuration, dust generated as a result of the wheel coming into contact with the upper surface (travel surface) of the travel rail that is located in an open space is unlikely to diffuse into the open space. In other words, the travel surface has the through hole that is in communication with the internal space of the travel rail that has a hollow structure, and negative pressure is exerted in the through hole as a result of the air in the internal space being sucked by the suction device. Accordingly, the dust generated on the travel surface is sucked into the internal space via the through hole, and is unlikely to diffuse into the external space. Furthermore, since the internal space is closed except for the through hole, and the connection portion for the suction device, it is possible to exert sufficient negative pressure in the through hole. Accordingly, with this configuration, if the article transport vehicle travels with its wheel rolling on the travel surface provided on the upper surface of the travel rail, it is possible to appropriately remove dust that is generated by the travel.

Here, preferably, the suction device is installed on a wall surface of the peripheral wall on which no travel surface is formed, and the wall surface has a suction hole that brings the suction device into communication with the internal space.

Since the through hole is open in the travel surface, and the suction hole is provided in a surface other than the travel surface, it is possible to make air flow smoothly when negative pressure is exerted in the through hole via the internal space. Furthermore, the wheel rolls on the travel surface, and thus, if a suction hole is to be formed in the travel surface, then it may be necessary to increase the width of the travel rail or form the suction hole outside the range of travel. However, such a restriction is eliminated by forming the suction hole in a wall surface on which no travel surface is formed.

Here, preferably, the travel rail is formed by joining a plurality of rail members to each other in a direction along the travel path, and a joint portion in which two rail members are joined to each other along the travel path is provided with a sealing member that blocks communication between the internal space and the external space.

Often, a travel rail is formed by joining a plurality of rail members to each other. If air leaks from the joint portion in which the rail members are joined to each other, negative pressure that is exerted in the through hole becomes weak, and thus the force to suck the dust is impaired. If the suction force of the suction device is increased to ensure a suction force, this may lead to an increase in the cost of the suction device, in power consumption, or in the size of the suction device. Accordingly, it is preferable to provide the joint portion with a sealing member to ensure the seal of the internal space.

Here, preferably, the through hole in the travel surface has an opening whose diameter is smaller than a wheel width, which is a width in a rotation shaft direction of a contact surface of the wheel that comes into contact with the travel surface.

The larger the diameter of the through hole, the more likely the dust enters the internal space. However, since the through hole is open in the travel surface, if the opening has a large diameter, then there is the risk that the wheel may fall into the through hole, and noise or vibration of the article transport vehicle may increase. Furthermore, there is also the risk that the rim of the opening is likely to crack or wear due to coming into contact with the wheel, and the dust is likely to be generated. Accordingly, it is preferable that the diameter of the opening of the through hole be smaller than the wheel width.

Furthermore, as an aspect, two travel rails are laid in parallel to each other to constitute a travel rail pair, and assuming that a width direction is a direction that is orthogonal to the travel path, a width directional inner side is a side in the width direction on which a travel rail faces the other travel rail, and a width directional outer side is a side in the width direction that is opposite to the width directional inner side, each travel surface has a travel region in which the wheel travels on the width directional inner side, and the opening of the through hole on the width directional outer side of the travel region.

Wheels rolling on the openings of the through holes may increase noise or vibration of the article transport vehicle. Furthermore, there is also the risk that the rim of the opening may crack or wear, due to coming into contact with the wheel, and a large amount of dust may be generated. Accordingly, it is preferable that the travel surface be divided into a region (travel region) in which the wheel travels and a region in which the through hole is open. These regions do not need to be completely separated from each other, but it is preferable that these regions be provided on one side in a direction so that there is less overlap therebetween. In other words, if, as in the present configuration, the travel region is provided on the width directional inner side, and the opening of the through hole is provided on the width directional outer side of the travel region, then both regions are unlikely to overlap.

Here, preferably, the suction device is a fan filter unit in which a suction fan and a filter for capturing dust are formed as an integral unit, and the fan filter unit is installed on a side wall surface, on the width directional outer side, of the peripheral wall.

As a result of the suction device serving as a fan filter unit, it is possible to exert negative pressure in the through hole, and capture the sucked dust with the filter, thus making it possible to appropriately remove the dust. Furthermore, since the fan and the filter are formed as an integral unit, it is easy to, for example, install the suction device in the article transport facility, and replace the suction device for maintenance.

The invention claimed is:

1. An article transport facility in which a travel rail is laid along a travel path of an article transport vehicle, and the article transport vehicle travels with a wheel of the article transport vehicle rolling on a travel surface provided on an upper surface of the travel rail, wherein:
   the travel rail has a peripheral wall that includes a surface on which the travel surface is formed, and an internal space that is enclosed by the peripheral wall, and extends along the travel path,
   the travel surface has a through hole that passes through the peripheral wall, and brings the internal space into communication with an external space, the through hole having an opening formed in the travel surface,
   a suction device is in communication with the internal space, and is configured to suck air in the internal space is further provided, and
   the internal space is closed except for the through hole, and a connection portion for the suction device.

2. The article transport facility according to claim 1, wherein the suction device is installed on a wall surface of the peripheral wall on which no travel surface is formed, and the wall surface has a suction hole that brings the suction device into communication with the internal space.

3. The article transport facility according to claim 2, wherein the travel rail is formed by joining a plurality of rail members to each other in a direction along the travel path, and a joint portion in which two rail members are joined to each other along the travel path is provided with a sealing member that blocks communication between the internal space and the external space.

4. The article transport facility according to claim 3, wherein the through hole in the travel surface has the opening whose diameter is smaller than a wheel width, which is a width in a rotation shaft direction of a contact surface of the wheel that comes into contact with the travel surface.

5. The article transport facility according to claim 3, wherein:
   two travel rails are laid in parallel to each other to constitute a travel rail pair, and
   assuming that a width direction is a direction that is orthogonal to the travel path, a width directional inner side is a side in the width direction on which a travel rail faces the other travel rail, and a width directional outer side is a side in the width direction that is opposite to the width directional inner side, and
   each travel surface has a travel region in which the wheel travels on the width directional inner side, and the opening of the through hole on the width directional outer side of the travel region.

6. The article transport facility according to claim 5, wherein the suction device is a fan filter unit in which a suction fan and a filter for capturing dust are formed as an integral unit, and the fan filter unit is installed on a side wall surface, on the width directional outer side, of the peripheral wall.

7. The article transport facility according to claim 2, wherein the through hole in the travel surface has the opening whose diameter is smaller than a wheel width, which is a width in a rotation shaft direction of a contact surface of the wheel that comes into contact with the travel surface.

8. The article transport facility according to claim 2, wherein:
- two travel rails are laid in parallel to each other to constitute a travel rail pair, and
- assuming that a width direction is a direction that is orthogonal to the travel path, a width directional inner side is a side in the width direction on which a travel rail faces the other travel rail, and a width directional outer side is a side in the width direction that is opposite to the width directional inner side, and
- each travel surface has a travel region in which the wheel travels on the width directional inner side, and the opening of the through hole on the width directional outer side of the travel region.

9. The article transport facility according to claim 8, wherein the suction device is a fan filter unit in which a suction fan and a filter for capturing dust are formed as an integral unit, and the fan filter unit is installed on a side wall surface, on the width directional outer side, of the peripheral wall.

10. The article transport facility according to claim 1, wherein the travel rail is formed by joining a plurality of rail members to each other in a direction along the travel path, and a joint portion in which two rail members are joined to each other along the travel path is provided with a sealing member that blocks communication between the internal space and the external space.

11. The article transport facility according to claim 10, wherein the through hole in the travel surface has the opening whose diameter is smaller than a wheel width, which is a width in a rotation shaft direction of a contact surface of the wheel that comes into contact with the travel surface.

12. The article transport facility according to claim 10, wherein:
- two travel rails are laid in parallel to each other to constitute a travel rail pair, and
- assuming that a width direction is a direction that is orthogonal to the travel path, a width directional inner side is a side in the width direction on which a travel rail faces the other travel rail, and a width directional outer side is a side in the width direction that is opposite to the width directional inner side, and
- each travel surface has a travel region in which the wheel travels on the width directional inner side, and the opening of the through hole on the width directional outer side of the travel region.

13. The article transport facility according to claim 12, wherein the suction device is a fan filter unit in which a suction fan and a filter for capturing dust are formed as an integral unit, and the fan filter unit is installed on a side wall surface, on the width directional outer side, of the peripheral wall.

14. The article transport facility according to claim 1, wherein the through hole in the travel surface has the opening whose diameter is smaller than a wheel width, which is a width in a rotation shaft direction of a contact surface of the wheel that comes into contact with the travel surface.

15. The article transport facility according to claim 14, wherein:
- two travel rails are laid in parallel to each other to constitute a travel rail pair, and
- assuming that a width direction is a direction that is orthogonal to the travel path, a width directional inner side is a side in the width direction on which a travel rail faces the other travel rail, and a width directional outer side is a side in the width direction that is opposite to the width directional inner side, and
- each travel surface has a travel region in which the wheel travels on the width directional inner side, and the opening of the through hole on the width directional outer side of the travel region.

16. The article transport facility according to claim 15, wherein the suction device is a fan filter unit in which a suction fan and a filter for capturing dust are formed as an integral unit, and the fan filter unit is installed on a side wall surface, on the width directional outer side, of the peripheral wall.

17. The article transport facility according to claim 1, wherein:
- two travel rails are laid in parallel to each other to constitute a travel rail pair, and
- assuming that a width direction is a direction that is orthogonal to the travel path, a width directional inner side is a side in the width direction on which a travel rail faces the other travel rail, and a width directional outer side is a side in the width direction that is opposite to the width directional inner side, and
- each travel surface has a travel region in which the wheel travels on the width directional inner side, and the opening of the through hole on the width directional outer side of the travel region.

18. The article transport facility according to claim 17, wherein the suction device is a fan filter unit in which a suction fan and a filter for capturing dust are formed as an integral unit, and the fan filter unit is installed on a side wall surface, on the width directional outer side, of the peripheral wall.

* * * * *